May 14, 1963 H. HINTZEN 3,089,690
SPRING MOUNTING MEANS
Filed June 30, 1960 2 Sheets-Sheet 1

HEINZ HINTZEN
INVENTOR.

BY John R. Faulkner
Clifford L. Sadler

ATTORNEYS

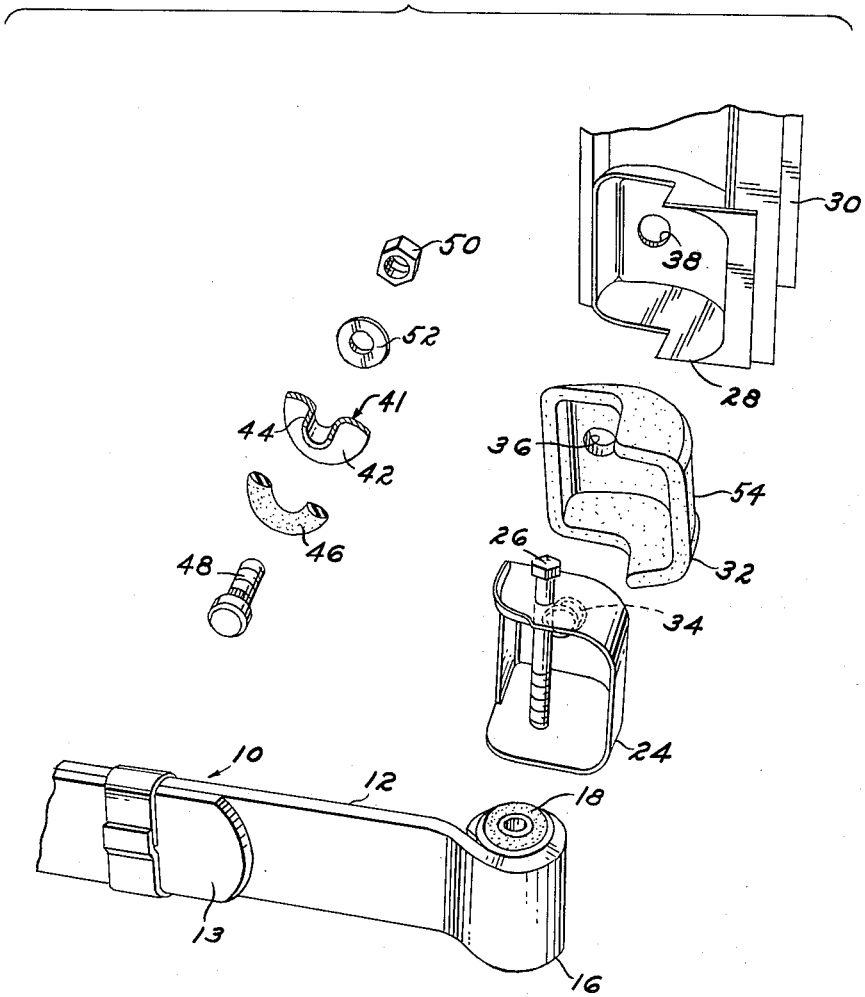

United States Patent Office 3,089,690
Patented May 14, 1963

3,089,690
SPRING MOUNTING MEANS
Heinz Hintzen, Grosse Pointe Farms, Mich., assignor to Ford Motor Company, Dearborn, Mich., a corporation of Delaware
Filed June 30, 1960, Ser. No. 39,917
8 Claims. (Cl. 267—30)

The present invention relates to vehicle suspension systems and more particularly to resilient mounting means for leaf type suspension springs.

In the conventional vehicle suspension system employing leaf springs, the ends of the springs are curled over to form spring eyes. Cylindrically shaped rubber bushings are placed within the eyes and bolts passed through the centers of the bushings for direct attachment to frame mounted brackets. These bushings isolate vibrations to a degree determined by the static deflection in the direction in which a static load is applied, and the design, therefore, is a compromise.

The present invention provides a spring attaching bracket having improved isolation characteristics. In accordance with this improvement a cup shaped rubber piece is interposed between a pair of nested cup shaped bracket members. With this invention the isolation rubber part is of plain mold construction and of low cost design since no expensive processes such as bonding to metal parts is required. The rubber is shaped so that the most effective spring isolation can be provided in each direction that a dynamic load is applied.

Due to the construction of this mounting bracket, a means of establishing the proper preset in the rubber isolation part is provided.

In accordance with the preferred embodiment of the present invention the cup shaped bracket parts and isolation rubber piece are held together by a bolt that cooperates with a washer member having a central tubular portion. A doughnut shaped rubber piece is interposed between the washer and the frame member to which the cup shaped pieces are secured. The central region of the rubber cup is relieved so that its sides carry normal loads in shear.

With this construction a low spring rate can be utilized under normal load conditions but this rate can be designed to increase rapidly if maximum dynamic loads are encountered. This is achieved by the configuration of the relieved portion of the rubber isolation piece which allows the rubber to act in shear under normally dynamic loads but bottoms out and puts the rubber into compression under extreme momentary dynamic loads, thus preventing excessive deflection.

This unique construction allows the use of unbonded rubber in shear. In the usual application of rubber mountings in shear, bonding to metal is required.

These and further objects and advantages of the present invention will be fully appreciated from the following description and accompanying drawing, in which:

FIGURE 3 is an exploded view showing the assembly of the mounting bracket.

Referring now to the drawings for a complete description of the present invention wherein like reference numerals identify like parts, FIGURE 1 discloses the preferred embodiment of the present invention.

Figure 1:
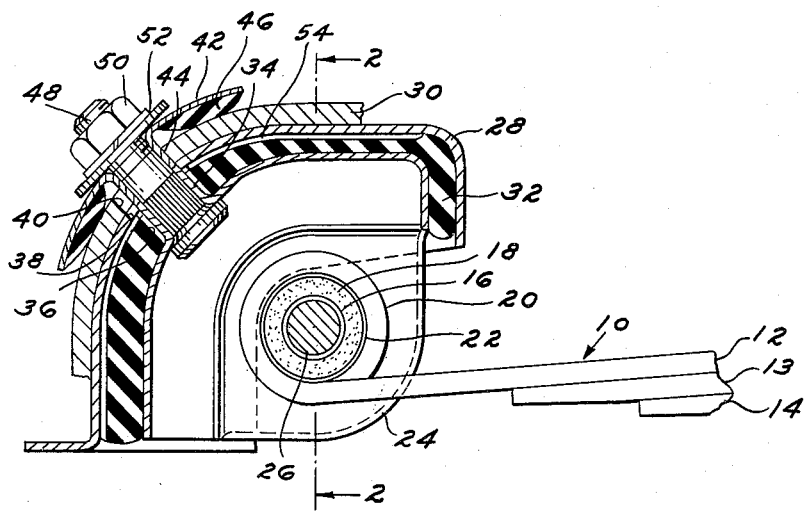
FIGURE 1 is an elevational view partly in section of the mounting device of the present invention.

In FIGURE 1 a vehicle suspension spring 10 having a series of flat leaf members 12, 13 and 14 is shown. Leaf member 12 is of the greatest length and has its end curled over to form an eye 16, a rubber bushing 18 is positioned within the eye 16 and has a pair of inner and outer tubular metal pieces 20 and 22 associated therewith.

A cup shaped inner bracket member 24 is positioned over the end of eye 16 and its side walls are secured thereto by a bolt 26 and nut 28 which passes through the inner tubular piece 20.

An outer cup shaped bracket member 28 is secured to frame or body structure 30 of the vehicle. A cup shaped molded rubber isolation piece 32 having inner and outer surfaces that complement the outer and inner faces of bracket pieces 24 and 28 is positioned therebetween.

Means are provided for securing the bracket pieces 24, 28 and rubber isolation member 32. A tubular portion 34 extends outwardly from a hole provided in the inner bracket member 24. Aligned complementary openings are provided at 36 in the rubber member 32, at 38 in the outer bracket member 28 and at 40 in the frame structure 30. A hat shaped member 41 having a washer portion 42 extending over the outer surface of the frame 30 is provided with a tubular portion 44 that extends into the holes 40 and 38. Tubular portion 44 of member 41 forms an extension of the tubular portion 34 of the inner bracket pieces 24.

A doughnut shaped rubber piece 46 is interposed between the washer portion 42 and the frame structure 30. A bolt 48 passes through the two tubular pieces 34, 44 and is secured by a nut 50 and a pair of washers 52.

The tubular portions 34 and 44 are selected of such length that when the bolt and nut combination 48, 50 is tightened, a pre-established initial load is placed upon the cup shaped rubber piece 32 and doughnut rubber 46.

The rubber isolation cup 32 surrounds the cup bracket member 24 on all sides so that it will be effective in isolating vibrations associated with the suspension spring member 10. The doughnut rubber piece 46 will function to cushion tension loads that the cup shaped rubber member 32 is not positioned to handle.

Figure 2:
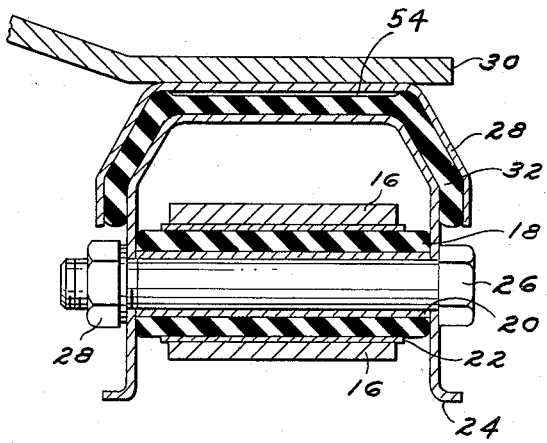
FIGURE 2 is a sectional view taken along section lines 2—2 of FIGURE 1.

It will be noted from FIGURES 1 and 2 that the central region of the exterior surface of the rubber piece 32 is relieved at 54 so that, as seen in FIGURE 2, only the side portions of the cup shaped piece 32 are in contact with the outer cup member 28.

Due to the relieved portion 54 and the fact that the rubber piece 32 is preloaded, only the side portions are in full contact with both bracket members 24 and 28. The isolation rubber is thus loaded in shear to carry the dynamic loads encountered by normal operation and vibration of the spring suspension member 10. Therefore, a shear type mounting employing rubber is provided that does not require the bonding of the rubber to the metal supporting brackets.

The foregoing description sets forth the preferred constructon of this invention. Other modifications may occur to those skilled in the art which will come within the scope and spirit of the appended claims.

I claim:

1. A leaf spring and a device for mounting the end of said leaf spring comprising a pair of nested cup shaped bracket members, a cup shaped rubber piece interposed between said bracket members, means for preloading said rubber piece and holding said bracket members together, said means comprising a second rubber piece positioned on the outside of one of said bracket members, a securing device passing through said members and said rubber pieces, and pivot means securing said spring end on one of said members.

2. A leaf spring and a device for mounting the end of said leaf spring comprising a pair of nested cup shaped bracket members, a cup shaped rubber piece interposed between said bracket members, means for preloading said rubber piece and holding said bracket members together, said rubber piece having a central relieved region so that only its sides are in contact with one of said members, and pivot means mounting said spring end on one of said members.

3. A leaf spring and device for mounting the end of said leaf spring comprising a pair of nested cup shaped bracket members, a cup shaped rubber piece interposed between said bracket members, means for preloading said rubber piece and holding said bracket members together, said means comprising a second rubber piece positioned on the outside of one of said bracket members, a securing device passing through said members and said rubber pieces, said cup shaped rubber piece having a central relieved region so that only its sides are in contact with one of said members, and pivot means mounting said spring end on one of said members.

4. A leaf spring end and a resilient mounting device therefor comprising a sandwich construction of inner and outer bracket members and a rubber element interposed between said bracket members, said rubber element having a generally U-shaped configuration in cross-section, means preloading said rubber piece and holding said bracket members together, the central region of said element being relieved and substantially unstressed, and the side portions of said rubber element being under substantial compressive stress, pivot means secured to said inner bracket member and to said spring end.

5. A leaf spring end and a resilient mounting device therefor comprising a pair of cup shaped inner and outer bracket members, a cup shaped rubber element interposing between said bracket members, means for preloading said rubber element and holding said bracket members together, the center portion of said rubber element being substantially stress free and the side portion of said rubber element being under substantial compressive stress, pivot means secured to said inner bracket member and to said spring end.

6. A leaf spring and a device for mounting said leaf spring comprising a hollow cup shaped inner bracket member and a hollow cup shaped outer bracket member nesting in each other, one of said bracket members having side wall portions extending beyond the peripheral edge of the other bracket member, a prestressed rubber piece interposed between the nested portions of the inner and outer bracket members, and means for pivotally attaching said leaf spring to the side wall portions of said one of the bracket members.

7. A spring and a supporting device therefor having a pair of hollow cup shaped bracket members nesting in each other, one of said pair of bracket members having side wall portions extending beyond the side wall defining the cup shape of the other of said pair of bracket members, a rubber piece interposed between the nested portions of said pair of bracket members, means for preloading said rubber piece and securing said pair of bracket members together, portions of said rubber piece interposed between the nested side walls of said cup shaped pair of bracket members placed under a compressive load by said means, and means for pivotally attaching said spring to the extended side wall portions of the one of said pair of bracket members.

8. A spring and a supporting device therefor having an inner hollow cup shaped bracket member and an outer hollow cup shaped bracket member nesting in each other, said inner bracket member having side wall portions extending beyond the side walls defining the cup shape of said outer bracket member, a rubber piece being complementary in shape to said outer bracket member and interposed between the nested portions of said inner and outer bracket members, means for preloading said rubber piece and securing said inner and outer bracket members together, portions of said rubber piece interposed between the nested side walls of said inner and outer bracket members placed under a compressive load by said means, and means for pivotally attaching said spring to the extended side wall portions of the inner bracket member.

References Cited in the file of this patent

UNITED STATES PATENTS

| 1,697,871 | Jansson | Jan. 8, 1929 |
| 1,725,523 | Keys | Aug. 20, 1929 |
| 2,642,252 | Pietz | June 16, 1953 |
| 2,973,951 | Billing | Mar. 7, 1961 |

FOREIGN PATENTS

| 243,385 | Great Britain | Dec. 10, 1925 |
| 545,841 | Great Britain | June 16, 1942 |